May 14, 1957 L. A. BIXBY 2,791,912
COMBINE DRIVE
Filed Oct. 1, 1953 4 Sheets-Sheet 1
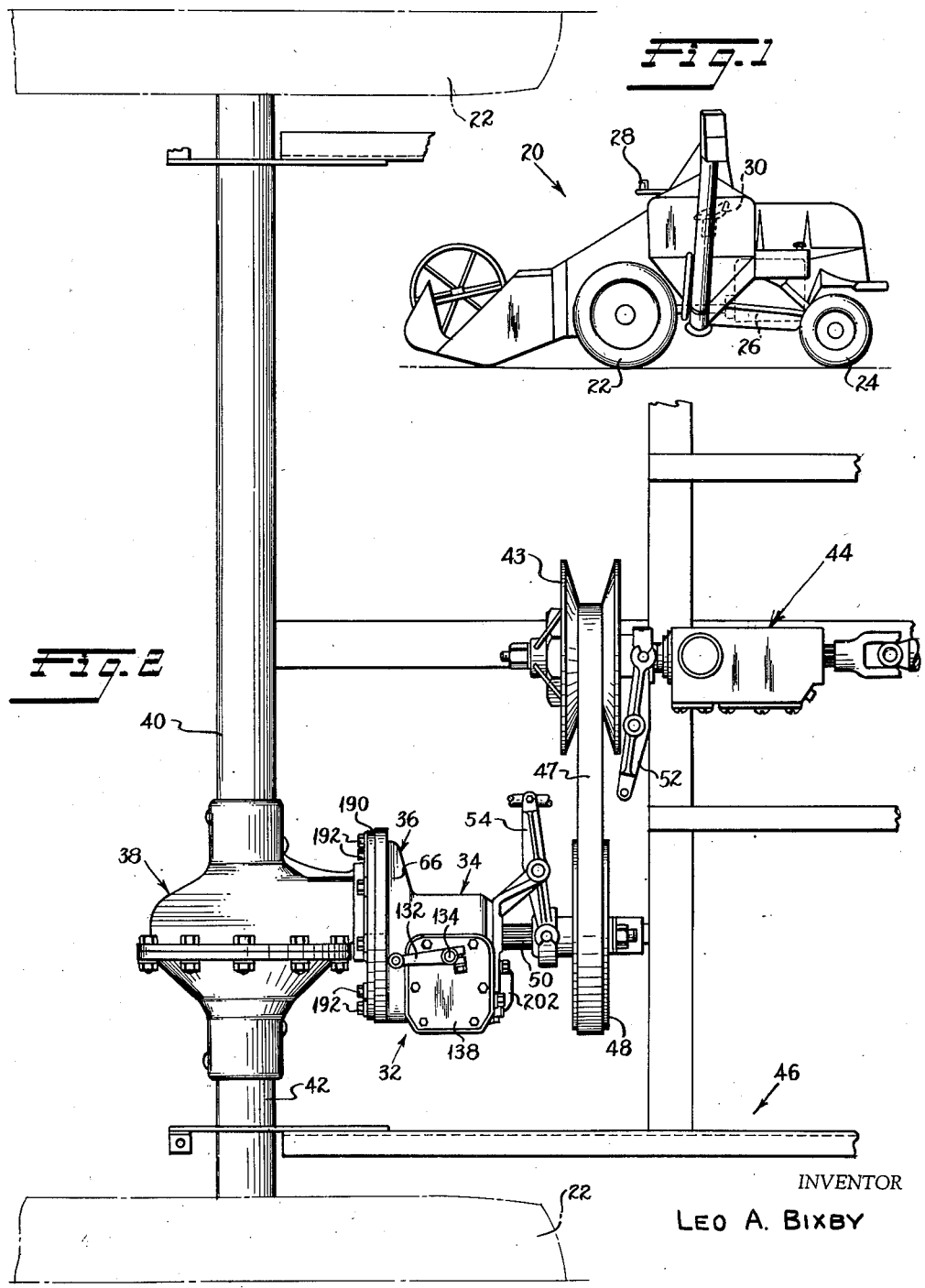
INVENTOR
LEO A. BIXBY
BY Strauch, Nolan + Diggins
ATTORNEYS

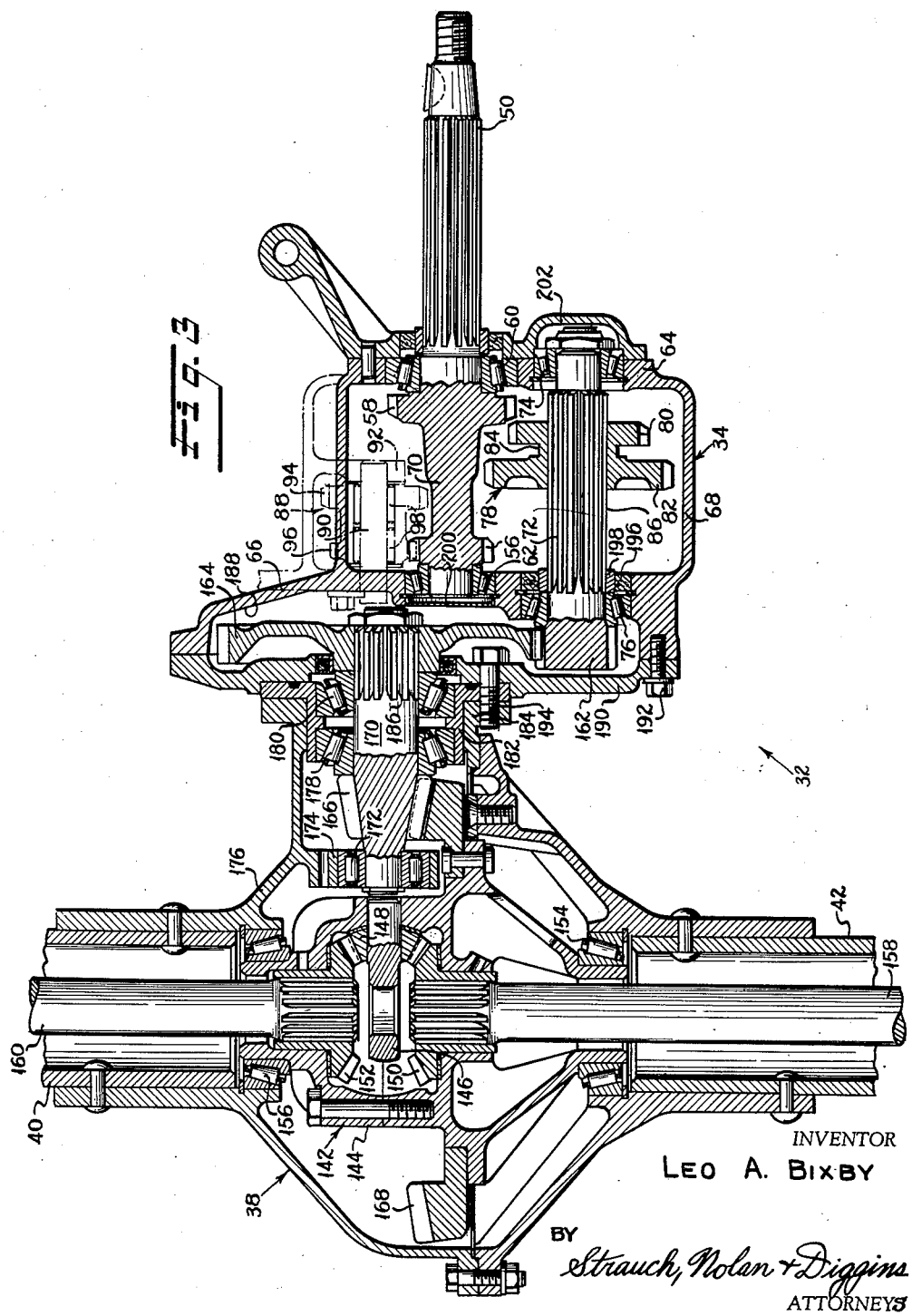

May 14, 1957

L. A. BIXBY 2,791,912

COMBINE DRIVE

Filed Oct. 1, 1953

INVENTOR
LEO A. BIXBY

BY
Strauch, Nolan & Diggins
ATTORNEYS

May 14, 1957. L. A. BIXBY 2,791,912
COMBINE DRIVE
Filed Oct. 1, 1953 4 Sheets-Sheet 4
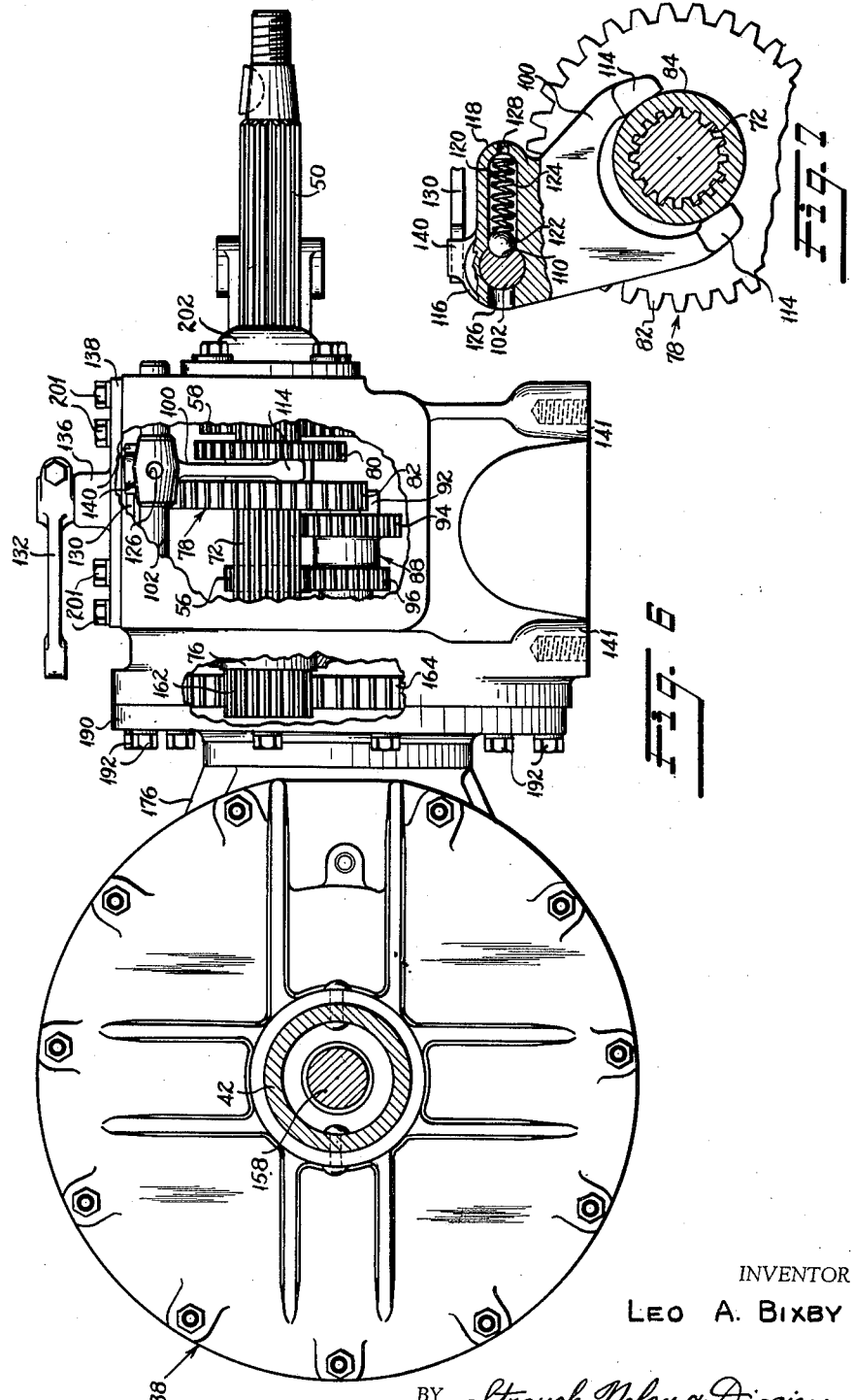
INVENTOR
LEO A. BIXBY
BY Strauch, Nolan & Diggins
ATTORNEYS

United States Patent Office 2,791,912
Patented May 14, 1957

2,791,912
COMBINE DRIVE

Leo A. Bixby, Niles, Mich., assignor to Rockwell Spring and Axle Company, Coraopolis, Pa., a corporation of Pennsylvania Application October 1, 1953, Serial No. 383,663

16 Claims. (Cl. 74—344)

This invention relates to vehicle drive mechanisms and more particularly to improvements in drive mechanisms for low speed agricultural implements such as crop harvesting vehicles.

In crop harvesting vehicles such as combines the space problems are extremely critical because of the many operating elements, such as the cutter bar, crop gathering reel, header, conveyor, separator, elevator, grain bin, blower and other associated elements which must necessarily be mounted directly on, or from, structure mounted on the vehicle frame.

Because of the necessarily complicated nature of combines there have been constant and heretofore unsatisfactory efforts by those skilled in the art to provide a drive mechanism for such vehicles that is inexpensive, structurally simple, easily serviced, and which requires a minimum of mounting space in the combine frame structure.

Heretofore in the design of crop harvesting vehicles such as combines and other motorized agricultural implements, it has been customary to utilize a progressive automotive type transmission. Such transmissions are not only relatively complex and expensive to manufacture and service but also are far from being well suited to agricultural operations. In the normal operation of a vehicle of this type, a single forward speed gear ratio will suffice during the harvesting of any single crop although different speed gear ratios may be required for different crops. There is therefore no need to progressively shift from lower forward speed ratios to higher forward speed ratios as is the case with automotive vehicles. It is, however, highly desirable in combines to be able to rapidly and easily effect shifting directly between any chosen forward speed ratio and a reverse drive for maximum control and maneuverability of the combine.

It is the primary object of the present invention to provide an improved vehicle drive mechanism peculiarly adapted for agricultural implements in that it is relatively simple and inexpensively manufactured, easily serviced, readily mounted in the limited space allowed in the vehicle, and uniquely and simply provides rapid maximum control over the vehicle operations thereby assuring more maneuverability and efficient operation of the vehicle and less operator fatigue.

To carry out the foregoing described purposes there is herein provided an improved vehicle drive mechanism for crop harvesting vehicles embodying a compact arrangement of transmission, transfer mechanism, and axle drive mechanism wherein the improved transmission permits direct shifting between any forward speed ratio and a reverse drive to provide optimum control over the movement of the vehicle.

A further object of the present invention is to provide a unitary drive mechanism for combines and the like embodying an improved and simplified lubricating structure which assures proper lubrication of all moving parts.

A still further object of the present invention is to provide a unitary drive mechanism for combines and the like which is of such improved construction that the various component mechanisms are readily accessible for maintenance purposes without interference with the remaining component mechanisms.

These and other objects will become more fully apparent from the following description and appended claims when read in conjunction with attached drawings, wherein:

Figure 1 is a side elevational view of a combine vehicle in which the present invention finds particular utility;

Figure 2 is a fragmentary top plan view of the vehicle drive axle assembly showing the relative positions and mounting of the transmission and final drive of this invention;

Figure 3 is a sectional view of the transmission and final drive of the invention, the section of the transmission being taken along the line 3A—3A of Figure 4, the section through the transfer gearing along the line 3A—3, and the section of the axle assembly along the line 3—3 of Figure 4;

Figure 6 is a side elevational view showing the horizontal disposition of the transmission and transfer unit relative to the axle differential and partially broken away to show details of the transmission shifter mechanism; and Figure 7 is a side elevational view partially broken away of the novel transmission shifter fork.

Figures 4, 5:
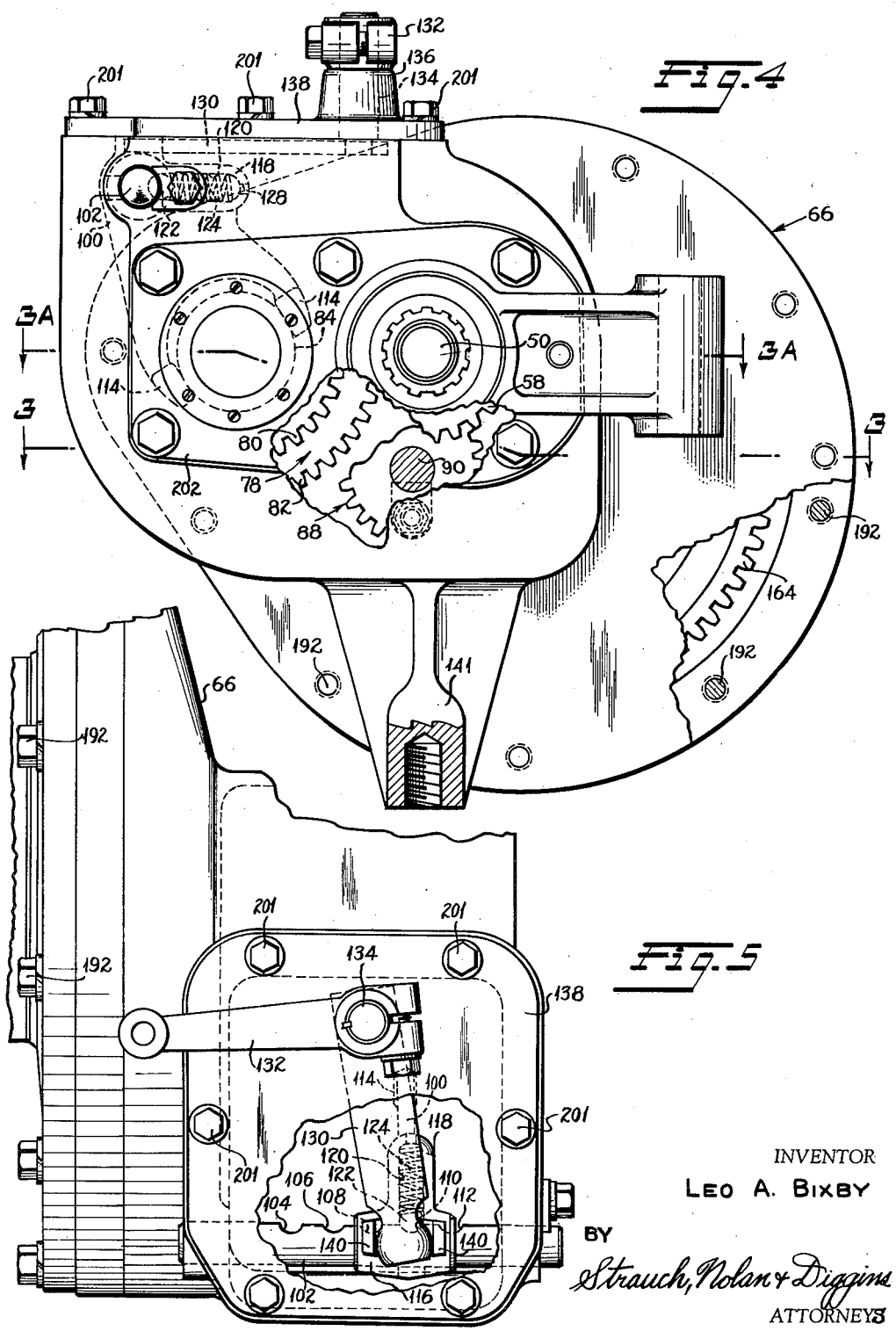
Figure 4 is an end elevational view partially broken away of the drive mechanism as viewed from the right hand end of Figure 3.
Figure 5 is a top plan view, partially broken away, of the novel transmission and transfer unit of the present invention.

Referring now to the drawings and particularly to Figure 1, a combine 20 of generally conventional overall arrangement is supported upon a pair of coaxial forward driving wheels 22 and a pair of smaller rear dirigible wheels 24. Driving power is supplied to the driving wheels 22 from an engine 26 suitably mounted in the combine frame while steering control over the dirigible wheels is effected from a steering wheel 28 mounted near an operator's seat 30.

As shown in the plan view of Figure 2, the novel transmission and final drive 32 of the present invention is a compact substantially unitary, structure consisting of a transmission section 34, a transfer case 36, and a drive axle differential section 38 interposed between axle sections 40 and 42.

Power is transmitted from engine 26 to a drive pulley 43 through a power take-off unit 44, which is suitably mounted on vehicle frame 46 substantially along the vehicle centerline and adapted to drive various accessories of the vehicle. Drive pulley 43 transmits driving torque by belt 47 to a driven pulley 48 that is splined to the input shaft 50 of the transmission 34. Drive pulley 43 and driven pulley 48, each of which is of a well known variable type wherein one side of each pulley is axially fixed and the opposed side is selectively spaced relative thereto, are controlled by shifter arms 52 and 54 respectively through independent links (not shown) to a suitable common actuating mechanism to form a variable speed drive connection between the output shaft of unit 44 and the transmission input shaft 50.

Referring to Figure 3, transmission input shaft 50, which is provided with axially spaced integral gears 56 and 58, is rotatably mounted on spaced anti-friction bearings 60 and 62 which are mounted in aligned apertures in the opposite end walls 64 and 66 of the housing 68 of transmission 34.

The portion 70 of shaft 50 located intermediate gears 56 and 58 is of reduced cross section to provide clearance relative to the associated transmission gears within housing 68.

An axially fixed transmission output shaft 72 is journalled by anti-friction bearings 74 and 76, provided in axially aligned bores in end walls 64 and 66 respectively.

A transmission gear cluster 78, comprising gears 80 and 82 axially spaced by an annular groove 84, is mounted for rotation with and axial sliding movement along an externally splined portion 86 of shaft 72 intermediate bearings 74 and 76. The position of gear cluster 78 axially of shaft 72 is controlled by a shifter mechanism which will be described presently.

For purposes of clarity and ease of description reverse gear cluster 88 is shown in phantom lines in Figure 3 out of its normal position, the true position of the reverse gear cluster 88 being shown at the broken away portion of Figure 4.

Reverse gear cluster 88 is journalled on a shaft 90 fixed in aligned bores of end wall 66 and an inwardly extending parallel support bracket 92 integral with housing 68. Reverse gear cluster 88, which comprises a pair of integral axially spaced gears 94 and 96, is rotatably mounted on shaft 90 by two sets of axially spaced anti-friction bearings 98.

Gear 96 of reverse gear cluster 88 is constantly meshed with gear 56 of transmission input shaft 50.

As has been indicated, this improved transmission has five possible shifted conditions, a high speed forward, a neutral, a reverse, a second neutral, and a low speed forward. The position of gear cluster 78 axially of the transmission output shaft 72 determines the selected one of these five possible conditions. As illustrated in Figures 3 and 6, gear cluster 78 is in one of its neutral positions. If gear cluster 78 is shifted to the right as viewed in those two figures, gear 80 will be meshed with gear 58 to establish a drive connection between input shaft 50 and output shaft 72. This position of gear cluster 78 is the high speed forward position of the transmission. If gear cluster 78 is shifted one step to the left of its illustrated position, gear 82 will be brought into mesh with gear 94 of reverse gear cluster 88 to thereby establish a reverse drive connection between input shaft 50 and output shaft 72 through meshed gears 56 and 96 and 94 and 82. If gear cluster 78 is shifted one step further to the left it will be in a second neutral position in which there is no drive connection between input shaft 50 and output shaft 72. If gear cluster 78 is shifted to a third step to the left, gear 82 will be brought into mesh with gear 56 on the input shaft 50 to establish a drive connection between input shaft 50 and the output shaft 72. This last position of the gear cluster 78 establishes the low speed forward drive connection between the input shaft 50 and the output shaft 72. The manner in which axial movement is imparted to gear cluster 78 to establish a selected one of these five possible axial positions will become apparent when the description of the shift mechanism, now to be described, is complete.

The transmission shifter mechanism will now be particularly described in reference to Figures 4, 5 and 6. Axial displacement of gear cluster 78 to the several described positions is effected by controlled movement of a shifter fork 100 that embraces gear cluster 78 in the groove 84, intermediate gears 80 and 82 and which is mounted upon and for sliding movement axially of a fixed shift rail 102.

Shift rail or rod 102, the axis of which is parallel to that of shaft 72, is fixed relative to housing 68 by a light press fit in axially aligned bores in walls 64 and 66 at the upper left hand corner portion thereof as viewed in Figure 4. Internally of housing 68, rail 102 is provided along one side with five axially spaced arcuate notches 104, 106, 108, 110 and 112. These detent notches coact with a resiliently biased ball detent to establish the several possible positions of fork 100 longitudinally of rail 102 and thereby, of gear cluster 78 (Figures 3 and 6) axially of shaft 72. Bifurcated shifter fork 100 (Figure 7) having opposed bearing portions 114 in engagement with the gear cluster 78 in the annular groove 84 thereof, extends upwardly and terminates in an apertured integral collar 116 through the aperture of which shifter rail 102 is slidably received. A boss 118 (Figures 4 and 7) integral with collar 116 and having a longitudinal bore 120 therein, receives a detent ball 122 biased into contact with an aligned one of the notches 104, 106, 108, 110, and 112 on rail 102 by a compression spring 124 disposed in compressed condition within bore 120. Opening 126 (Figures 6 and 7) in axial alignment with bore 120 is provided in collar 116 to permit insertion of spring 124 and ball 122 into bore 120 prior to sliding the collar onto rail 102. Opening 128 (Figures 4 and 7) at the end of boss 118 permits the introduction of oil splashed from the transmission gears to the ball 122 and spring 124, and facilitates removal of the ball 122 and spring 124 upon disassembly.

The displacement of shifting fork 100 to its several possible positions along the rail 102 is controlled through an actuating arm 130, which is disposed interiorly of the transmission casing 68, by a shift lever 132 disposed exteriorly of the transmission casing 68. As is most clearly shown in Figures 4 and 5, shift lever 132 and the actuating arm 130 are secured to the opposite ends of a connecting pin 134 which is journalled in the central aperture of a boss 136 formed integral with the top cover plate 138. The free end of arm 130, which is partially spherical in form, is embraced by spaced upwardly extending lugs 140 which are formed on the top of the collar 116 of the shifting fork 100. By this construction, clockwise movement of the shifting lever 132 as viewed in Figure 5, will impart leftward lateral displacement to the shifting fork 100 and counterclockwise movement of the shifting lever 132 will impart rightward lateral displacement of the shifting fork 100.

Notches 104, 106, 108, 110 and 112 on shift rail 102 define the low speed, neutral, reverse, neutral and high speed positions, respectively, of transmission gear cluster 78 previously described.

From the foregoing it can be readily seen that the transmission permits the single axially shiftable gear cluster to be moved directly to reverse from either a low or high speed forward setting and thus permits rapid reversal of the drive connection between input shaft 50 and output shaft 72 irrespective of the forward speed ratio selected.

As is apparent from Figures 2 and 6, the transmission unit 34 is cantilever supported from the nose of the differential receiving section 38 of the axle housing and, in addition is provided with a depending integral support structure terminating in threaded mounting lugs 141 by which it is secured to a portion (not shown) of the vehicle frame 46. As is most clearly shown in Figure 3, the differential mechanism 142 of the differential section 38 is conventional in form consisting of a cage 144 in which is mounted a spider 146 having pinions 148 journalled upon each of the equi-angularly spaced arms thereof in constant mesh with the opposed side gears 150 and 152. The differential cage 144 is journalled in opposed anti-friction bearings 154 and 156 at the opposite sides of the differential receiving portions 38 of the axle housing. The opposite side gears 150 and 152 are splined respectively to axle shafts 158 and 160 for the transmission of power to the drive wheels 22.

Power is transmitted from transmission output shaft 72 to impart rotary motion to the differential cage 144 through constantly meshed transfer gears 162 and 164 and constantly meshed differential bevel drive pinion 166 and bevel ring gear 168 which is fixed to differential cage 144. Gears 162 and 164 provide a first drive reduction, and gears 166 and 168 provide a second drive reduction.

The differential drive pinion 166 is formed integral with a shaft 170 which is journalled at its differential end by an antifriction bearing 172 mounted within a bore of a transversely extending partition 174 that forms an integral extension of the casing member 176 of the differential receiving section 38 and at its transmission end by opposed anti-friction bearings 178 and 180 which are mounted within a bearing cage 182 which interfits with the end bore of the differential receiving portion nose 184. It is to the splined end portion 186 of shaft 170 that the transfer gear 164 is fixed.

The transfer gears 162 and 164, which are preferably hypoid gears, are housed within a transfer gear chamber 188 defined by the concave face of end wall 66 of the transmission housing 68 and an opposed end plate 190 fixed thereto as by bolts 192. End plate 190 and the radially extending flange portion of bearing case 182 interposed between the adjacent faces of end plate 190 and the end face of the differential receiving portion nose 184, are secured to that nose portion 184 by spaced bolts 194, to form a rigid assembly.

An important aspect of this improved combine drive mechanism resides in the lubricating structure thereof. As is best illustrated in Figure 3, the transmission housing 68 is of sealed construction. An oil seal 196, supported by ring 198 which is pressed fitted on shaft 72, and a cap 200 closing the aperture in which bearing 62 is mounted, seal the transmission from the transfer gear chamber 188. In this new horizontal type transmission, the center line of fixed shaft 90 for reverse gear cluster 88 lies below the horizontal plane of the axes of input shaft 50 and output shaft 72 as is shown in Figure 4. Transmission housing 68 is filled with a common pool of oil to a uniform depth sufficient that each transmission gear dips therein and bearings 60, 62 and 74 and splines of shaft 72 are lubricated by the splash therefrom. Oil splash from the rotating oil dipping transmission gears supplies sufficient lubrication for collar 116 of shift fork 100 on shift rail 102. Even if the level of the oil pool falls low, sufficient oil is carried by and splashed from the constantly rotating reverse gear cluster 88 to lubricate the other transmission members. The transfer gear chamber 188 is provided with an oil pool in the bottom thereof in which gear 164 dips to lubricate gears 162 and 164 and bearing 76.

The differential receiving section 38 is provided with an oil pool into which the bevel gear 168 and differential cage 144 dip during their rotation. The cage 144 is apertured as shown to permit passage of lubricant to the pinions and side gears and to the side gear journals. The oil pool in the differential receiving section is of sufficient depth to effect lubrication of the bearings of shaft 170.

This transmission and the transfer gearing are of simple construction easily accessible for service and for assembly or disassembly. By removing frame bolts from transmission housing bolt holes of bosses 141 (Figure 6) and the transfer gear housing bolts 192 (Figure 3) and with the drive belt 47, pulley shift lever 54 and transmission shift lever 132 disconnected from their operating linkages, the transmission may they be lifted away, separating transfer gear housing wall 66 from end plate 190 to expose and separate transfer gear 162 from transfer gear 164. This removal of the transmission to obtain access to the transfer gearing can be accomplished without draining oil from the transmission. Gear 164 may then be removed after removing the nut by which it is fixed to shaft 170. The end plate 190 and end plate adapter bearing cage 182 with pinion shaft 170 may be removed from the nose 184 of differential receiving section 38 after removing bolts 194. The transmission gearing may be exposed by removing bolts 201 the top plate 138 and/or end plate 202.

From the foregoing it will be readily seen that there is herein disclosed a relatively simple rugged inexpensively manufactured easily serviced transmission and final drive and embodying for agricultural vehicles a simple highly efficient novel multi-speed ratio transmission for improved operating performance of the agricultural vehicles.

As is apparent from Figures 2 and 6, the differential and transmission are located toward one side of the vehicle frame 46 and the transmission is located directly to the rear of the differential so that the major portion of the length of the drive axle between the wheels 22 is clear thus providing space for mounting a large conveyor on the vehicle frame over the drive axle to feed the harvested crop from the reel and cutter bar.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embarced therein.

What is claimed and desired to be secured by United States Letters Patent is:

1. In a vehicle, a compact reversible variable speed ratio drive mechanism therefor adapted to permit rapid reversal of the direction of drive from any selected forward speed ratio, said drive mechanism comprising a drive axle assembly adapted at its ends to be supported upon ground engaging wheels and provided intermediate its ends with a differential receiving section having a differential mechanism rotatably mounted therein, and a transmission mechanism mounted upon said axle differential receiving section, said transmission mechanism having an input shaft and an output shaft journalled about spaced parallel axes extending longitudinally of the vehicle, a plurality of individually selectable drive connections between said shafts including a pair of forward drive connections and a reverse drive connection, and a member mounted for movement in a predetermined path among a plurality of operative positions to control at each such operative position the selection of one of said drive connections, said drive connections being so arranged relative to the path of movement of said member that the reverse drive connection can be selected by movement of said member from any operative position effecting forward drive to its next adjacent operative position.

2. In a vehicle drive mechanism, a differential receiving axle section having a differential mechanism mounted for rotation therein, a differential input pinion and shaft journalled on said axle section and drive coupled to said differential, an end plate removably secured to said axle section in transverse relation to the axis of said pinion shaft; a change speed and reverse drive transmission and a casing therefor having an exteriorly concave end wall connected to said end plate to define a chamber, and transfer gearing in said chamber interconnecting the output of said transmission and said pinion shaft, said differential receiving section, said chamber and said transmission casing being arranged in succcession longitudinally of the vehicle and provided with oil seals establishing lubricant reservoirs individual to said differential mechanism, said transfer gearing and said transmission.

3. In a change speed transmission, a power input shaft and a power output shaft journalled for rotation about spaced parallel axes, means adapted to provide a plurality of different drive connections between said input and output shafts, a member mounted for movement in a predetermined path and operative at each of a like plurality of spaced points along such path to effect a distinct one of said plurality of drive connections, such drive connections between said input and output shafts being such that movement of said member between any adjacent pair of its operative positions is effective to reverse the direction of drive between said input and output shafts.

4. A change speed transmission adapted for direct shifting between any of a plurality of forward speed ratios to a reverse drive condition, said transmission comprising a power input shaft, a power output shaft and an idler gear mounted for rotation about spaced parallel axes, a set of constantly meshed gears drive connecting said idler to one of said shafts, said gear set including a first gear fixed to said one shaft in axially offset relation to said idler gear in a first direction, a second gear fixed to said one shaft in axially offset relation to said idler gear in the opposite direction, a gear cluster mounted for rotation with and axial displacement along the other of said shafts and operatively engageable with said first, second or idler gears.

5. A change speed transmission adapted for direct shifting from any of a plurality of different forward speed ratios to a reverse drive condition comprising a power input shaft and a power output shaft journalled for rotation about spaced parallel axes, a pair of gears fixed in axially spaced relation for rotation with one of said shafts, a gear cluster mounted for rotation with and axial displacement along the other of said shafts to predetermined positions of meshing engagement with either of the gears on said one shaft, and a rotatably mounted reverse gear drive connected to said one shaft and engageable by said gear cluster at an axial position intermediate its positions of engagement with the gears on said one shaft.

6. A change speed transmission adapted for direct shifting between any of a plurality of forward speed ratios to a reverse drive condition comprising a casing; an input shaft, an output shaft and an idler gear mounted for rotation about spaced parallel axes; a gear cluster mounted for rotation with and axial movement along one of said shafts to each of a plurality of axially spaced operative positions including an intermediate position of meshing engagement with said idler gear, each adjacent pair of operative positions of said gear cluster being separated by an inoperative position, a gear fixed to the other of said shafts in alignment with each operative position of said gear cluster other than said intermediate position, each such fixed gear being adapted to operatively mesh with said gear cluster when said gear cluster is shifted to such aligned operative position, means drive coupling said other shaft and idler gear, and shifter means for controlling the axial position of said gear cluster.

7. A change speed transmission adapted for direct shifting between any of a plurality of forward speed ratios to a reverse drive condition comprising a casing; an input shaft, an output shaft and an idler gear mounted for rotation about spaced parallel axes; a gear cluster mounted for rotation with an axial movement along one of said shafts to each of a plurality of axially spaced operative positions including an intermediate position of meshing engagement with said idler gear, each adjacent pair of operative positions of said gear cluster being separated by an inoperative position, a gear fixed to the other of said shafts in alignment with each operative position of said gear cluster other than said intermediate position, each such fixed gear being adapted to operatively mesh with said gear cluster when said gear cluster is shifted to such aligned operative position, means drive coupling said other shaft and idler gear, and shifter means for controlling the axial position of said gear cluster, said shifter means comprising a rod mounted in spaced parallel relation to said shafts, a shift fork axially slidably mounted on said rod and operatively engaging said gear cluster for controlling the axial position thereof, coacting detent means on said rod and fork for locating said fork at each of a plurality of positions corresponding to the several positions of said gear cluster, an actuating means for imparting axial movement to said fork.

8. A change speed transmission adapted for direct shifting between any of a plurality of forward speed ratios to a reverse drive condition comprising a casing; an input shaft, an output shaft and an idler gear mounted for rotation about spaced parallel axes; a gear cluster mounted for rotation with and axial movement along one of said shafts to each of a plurality of axially spaced operative positions including an intermediate position of meshing engagement with said idler gear, each adjacent pair of operative positions of said gear cluster being separated by an inoperative position, a gear fixed to the other of said shafts in alignment with each operative position of said gear cluster other than said intermediate position, each such fixed gear being adapted to operatively mesh with said gear cluster when said gear cluster is shifted to its aligned operative position, means drive coupling said other shaft and idler gear, and shifter means for controlling the axial position of said gear cluster, said shifter means comprising a rod mounted in spaced parallel relation to said shafts, a shift fork axially slidably mounted on said rod and operatively engaging said gear cluster for controlling the axial position thereof, coacting detent means on said rod and fork for locating said fork at each of a plurality of positions corresponding to the several positions of said gear cluster, an actuating means for imparting axial movement to said fork, said detent means comprising a series of indentations axially spaced along said rod in positions corresponding to the operative and inoperative positions of said member and resiliently biased means on said fork adapted to engage an aligned one of said indentations to maintain said fork and gear cluster in a shifted position.

9. In a vehicle, a readily disassemblable compartmentalized drive mechanism comprising a drive axle housing assembly supported upon ground engaging wheels and provided adjacent one end with a differential receiving section having a differential mechanism rotatably received therein, said differential receiving axle section having a nose portion extending longitudinally of the vehicle, a differential drive pinion and shaft therefor rotatably mounted in said nose portion, a plate member mounted upon said nose portion in transverse relation to the axis of said pinion and shaft, a change speed and reverse drive transmission and casing therefor providing a sealed lubricant reservoir for said transmission, said casing having an externally concave endwall adapted to coact with said plate member to define a transfer gear chamber, a first transfer gear fixed to said pinion shaft on the side of said plate member opposite said differential mechanism, a second transfer gear mounted for rotation within the concavity of said concave transmission casing endwall and driven by the output of said transmission, and means mounting said transmission on said plate member to mesh said transfer gears and to form a sealed chamber about said transfer gears defined by said plate member and the concave endwall of said transmission casing.

10. In a vehicle having a transverse drive axle housing comprising an enlarged differential receiving portion open on one side, differential mechanism rotatably mounted within said housing portion and having a ring gear, a gear box mounted on said housing portion and comprising a first section removably secured to said housing portion and a second section removably secured to said first section, an internal wall in said second section providing with said first section a forward transfer gear space and defining a rearward variable speed transmission space, a pinion shaft journalled on said axle housing portion having a pinion at one end meshed with said ring gear and a first transfer gear on its other end disposed in said transfer gear space, a transmission output shaft extending between said spaces and having on its front end a second transfer gear meshed with said first transfer gear, a transmission input shaft journalled on said gear box, all of said shafts being parallel, and shiftable transmission gearing in said variable speed transmission space between said input and output shafts.

11. In the vehicle defined in claim 10, the axes of said transmission input and output shafts being located at the same level and lying in a horizontal plane above the axis of said pinion shaft.

12. A change speed transmission for a vehicle comprising parallel input and output shafts, one of said shafts having two different sized axially spaced gears fixed thereto and the other shaft having slidably mounted thereon gear means adapted when meshed with one or the other of said two different sized gears to provide respectively low and high speed drives for the vehicle, and reverse gearing adapted to be drive connected between said input and output shafts by said slidable gear means when the latter is in a position intermediate mesh with one or the other of said different sized gears, said slidable gear means being thereby effective to establish reverse drive in a direct shift from either forward drive condition.

13. A change speed transmission comprising input and output shafts and a reverse idler gear assembly mounted for rotation on parallel spaced axes, axially spaced gears of different size fixed upon said input shaft, shiftable gear means non-rotatably mounted on said output shaft and slidable therealong to mesh with either of said gears on the input shaft, said idler gear assembly being constantly meshed with one of said gears on the input shaft and being so located that said shiftable gear means may be shifted into mesh with said idler gear assembly directly from mesh with either of said input shaft gears.

14. The transmission defined in claim 13, wherein said idler gear assembly comprises two spaced gears, one meshed with the smaller gear on said input shaft and the other located axially intermediate the input shaft gears.

15. In a vehicle drive mechanism, a transverse drive axle housing having an enlarged differential portion, differential mechanism within said housing portion, a first reduction gear housing side member removably secured upon said axle portion, a variable speed transmission housing formed on one side to serve as the other side member of said reduction gear housing removably secured to said first reduction gear housing side member, a pinion shaft drive connected to said differential mechanism journalled on said axle housing and projecting into said reduction gear housing, a transmission output shaft projecting in said reduction gear housing, and constantly meshed drive reduction gears on the ends of said shafts within said reduction gear housing.

16. In the vehicle defined in claim 15, means sealing against escape of transmission lubricant into said reduction gear housing whereby access may be gained to the reduction gearing without draining the transmission lubricant.

References Cited in the file of this patent

UNITED STATES PATENTS

| | | |
|---|---|---|
| 1,119,958 | Hewitt et al. | Dec. 8, 1914 |
| 2,011,355 | Devener et al. | Aug. 13, 1935 |
| 2,187,614 | Ormsby | Jan. 16, 1940 |
| 2,361,190 | Gerst | Oct. 24, 1944 |
| 2,402,637 | Keese | June 25, 1946 |
| 2,403,162 | Zancan | July 2, 1946 |
| 2,521,730 | Keese | Sept. 12, 1950 |
| 2,531,818 | Kranick | Nov. 28, 1950 |